US012266855B2

(12) United States Patent
Qin et al.

(10) Patent No.: US 12,266,855 B2
(45) Date of Patent: Apr. 1, 2025

(54) ANTENNA SYSTEM

(71) Applicant: SHANGHAI CHUANGGONG TELECOM TECHNOLOGY CO., LTD., Shanghai (CN)

(72) Inventors: Zhongjie Qin, Shanghai (CN); Zhichao Zhang, Shanghai (CN)

(73) Assignee: SHANGHAI CHUANGGONG TELECOM TECHNOLOGY CO., LTD., Shanghai (CN)

( * ) Notice: Subject to any disclaimer, the term of this patent is extended or adjusted under 35 U.S.C. 154(b) by 185 days.

(21) Appl. No.: 17/785,365

(22) PCT Filed: Dec. 31, 2020

(86) PCT No.: PCT/CN2020/142399
§ 371 (c)(1),
(2) Date: Jun. 14, 2022

(87) PCT Pub. No.: WO2021/244026
PCT Pub. Date: Dec. 9, 2021

(65) Prior Publication Data

US 2023/0035028 A1 Feb. 2, 2023

(30) Foreign Application Priority Data

Jun. 5, 2020 (CN) ........................ 202010507913.8

(51) Int. Cl.
*H01Q 13/18* (2006.01)
*H01P 1/207* (2006.01)
(Continued)

(52) U.S. Cl.
CPC ............ *H01Q 13/18* (2013.01); *H01P 1/207* (2013.01); *H01Q 1/242* (2013.01); *H01Q 1/48* (2013.01); *H01Q 1/52* (2013.01)

(58) Field of Classification Search
CPC ........... H01Q 1/243; H01Q 1/38; H01Q 1/48; H01Q 13/10; H01Q 9/0407; H01Q 9/42; H01Q 15/14; H01Q 21/28; H01Q 9/0421
See application file for complete search history.

(56) References Cited

U.S. PATENT DOCUMENTS 11,537,170 B2 * 12/2022 Hori ...................... G06F 1/1656
2019/0221941 A1 * 7/2019 Liu ......................... H01Q 1/32
(Continued)

FOREIGN PATENT DOCUMENTS

CN 102882009 A 1/2013
CN 106935971 A 7/2017
(Continued)

OTHER PUBLICATIONS

International Search Report for PCT/CN2020/142399 mailed on Mar. 19, 2021.

*Primary Examiner* — Wei (Victor) Y Chan
(74) *Attorney, Agent, or Firm* — The PL Law Group, PLLC

(57) ABSTRACT

An antenna system according to an embodiment of the present disclosure includes an antenna unit and a metal cavity corresponding to the antenna unit. The metal cavity is grounded and provided with an opening connected with the outside. By introducing the metal cavity, an embodiment of the present invention solves the problem of multi-band mutual coupling caused by a common ground current by using the cavity filter structure with a small size.

11 Claims, 8 Drawing Sheets

(51) Int. Cl.

| | |
|---|---|
| ***H01Q 1/24*** | (2006.01) |
| ***H01Q 1/48*** | (2006.01) |
| ***H01Q 1/52*** | (2006.01) |

(56) References Cited

U.S. PATENT DOCUMENTS

| | | | | |
|---|---|---|---|---|
| 2019/0334254 | A1 | 10/2019 | Wu | |
| 2020/0194870 | A1* | 6/2020 | Yamamoto | G06F 1/1656 |
| 2023/0009333 | A1* | 1/2023 | Yun | H01Q 1/38 |
| 2023/0085202 | A1* | 3/2023 | Fu | H01Q 1/243<br>343/700 R |

FOREIGN PATENT DOCUMENTS

| | | | |
|---|---|---|---|
| CN | 107579351 | A | 1/2018 |
| CN | 207183544 | U | 4/2018 |
| CN | 207303367 | U | 5/2018 |
| CN | 110233328 | A | 9/2019 |
| CN | 110233357 | A | 9/2019 |
| CN | 209948056 | U | 1/2020 |
| CN | 110931962 | A | 3/2020 |
| CN | 111628292 | A | 9/2020 |

* cited by examiner

ANTENNA SYSTEM

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/CN2020/142399, filed Dec. 31, 2020, which claims priority to the benefit of Chinese Patent Application No. 202010507913.8 filed in the Chinese Intellectual Property Office on Jun. 5, 2020, the entire contents of which are incorporated herein by reference.

BACKGROUND

1. Technical Field

The present application relates to the technical field of antennas, and more specifically, to an antenna system.

2. Background of the Invention

Antennas are widely used in mobile terminals such as mobile phones. The main reasons for the coupling between antennas include space wave coupling, surface wave coupling and common ground current coupling, etc. The currently proposed decoupling solutions for many mobile phone terminal MIMO (Multi Input Multi Output) antennas, such as polarization decoupling, introduction of an EBG (electromagnetic band gap) structure, ground plane slotting, addition of decoupling branches to ground plane, etc., have shortcomings such as the too large decoupling structure, the complex structure and only decoupling of a single frequency point, and thus cannot be imported into real mobile phones. In addition, the common ground current leads to multi-band mutual coupling and affects the antenna performance.

SUMMARY

The technical problem to be solved by the present invention is to provide an antenna system in order to overcome the defect of multi-band mutual coupling caused by a common ground current in antennas in the prior art.

The present invention solves the foregoing technical problem through the following technical solutions:

The present invention provides an antenna system, comprising an antenna unit and a metal cavity corresponding to the antenna unit. The metal cavity is grounded and provided with an opening connected with the outside.

In an embodiment, the area covered by the metal cavity is larger than or equal to the area corresponding to the antenna unit.

In an embodiment, the antenna system further comprises a substrate. The antenna unit is arranged on one surface of the substrate, and the metal cavity is arranged on the other surface of the substrate.

In an embodiment, the antenna unit is arranged in a predetermined layout area of the substrate. The predetermined layout area is close to a side edge of the substrate.

In an embodiment, the predetermined layout area is close to two adjacent side edges of the substrate.

In an embodiment, the two adjacent side edges of the substrate are perpendicular to each other.

In an embodiment, the metal cavity comprises a first metal wall, a second metal wall and a third metal wall. The first metal wall, the second metal wall and the third metal wall are connected in pairs to form a cover-like structure. The cover-like structure and the substrate surround a cavity space.

In an embodiment, the predetermined layout area is a rectangle, and the predetermined layout area comprises a first edge and a second edge. The first edge and the second edge are adjacent and perpendicular to each other. The first metal wall is vertically connected with the substrate, the second metal wall is vertically connected with the substrate, and the first metal wall is vertically connected with the second metal wall. A connection portion between the first metal wall and the substrate corresponds to the first edge, and a connection portion between the second metal wall and the substrate corresponds to the second edge. The opening faces the outside of the substrate.

In an embodiment, the third metal wall is a rectangle, and the third metal wall is vertically connected with the first metal wall and the second metal wall, respectively.

In an embodiment, a distance between the third metal wall and the substrate is 3-6 mm.

In an embodiment, the substrate is provided with a ground plane. The ground plane covers an area of the back surface of the substrate which is not surrounded by the metal cavity.

In an embodiment, the number of the antenna units is 2, and the number of the metal cavities is 2.

In an embodiment, the two antenna units are symmetrically arranged, and the two metal cavities are symmetrically arranged.

In an embodiment, the antenna unit is an IFA (inverted-F antenna) antenna unit.

In an embodiment, the frequency band corresponding to the antenna unit covers the sub-6G (a communication frequency band) N1/N41 frequency bands.

The positive effect of the present invention lies in that the present invention solves the problem of multi-band mutual coupling caused by a common ground current by using the cavity filter structure with a small size.

DETAILED DESCRIPTION OF THE INVENTION

The present application will be further illustrated through Examples below. However, the present application is not intended to be limited to the scope of the Examples.

Example 1

Figure 1:
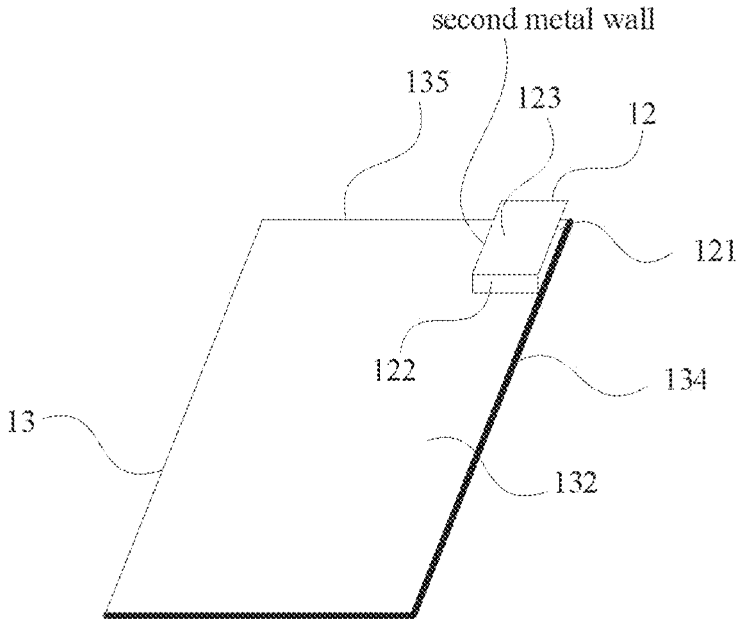
FIG. 1 shows a schematic perspective view of an antenna system according to Example 1 of the present application.
Figure 2:
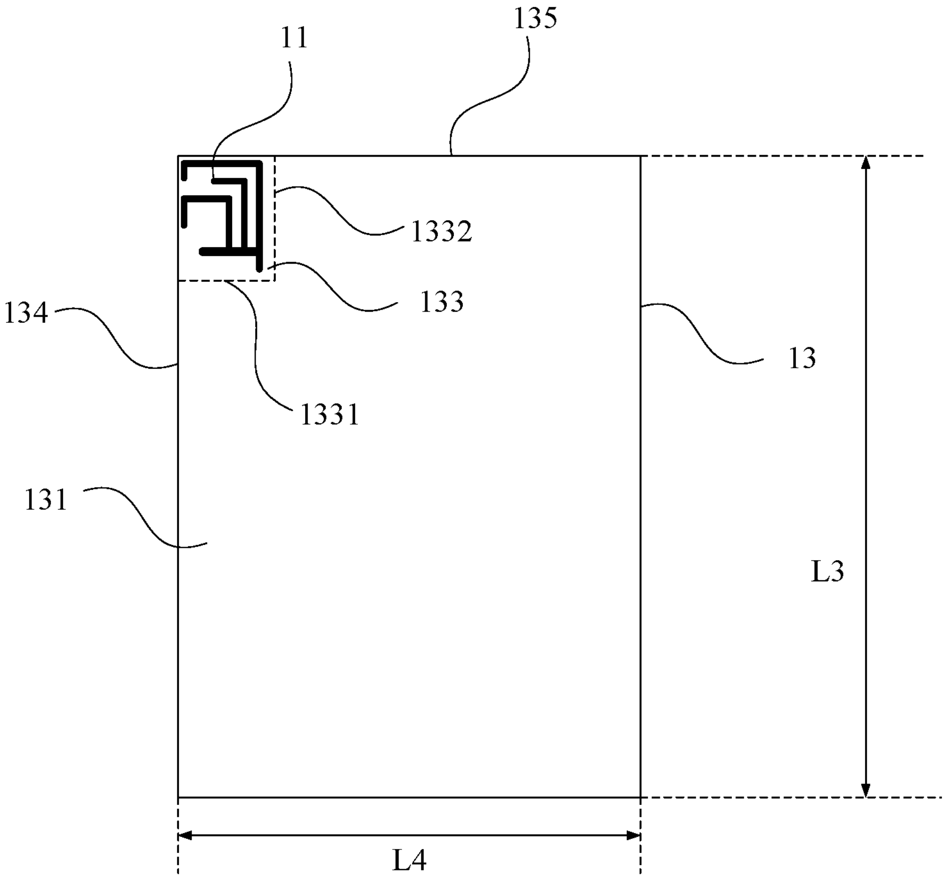
FIG. 2 shows a structural schematic view of the front surface of an antenna system according to Example 1 of the present application.
Figure 3:
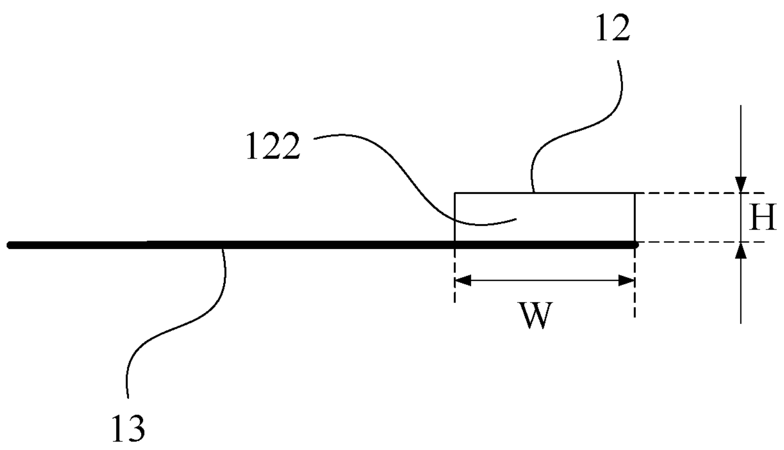
FIG. 3 shows a front view of an antenna system according to Example 1 of the present application.

The present Example provides an antenna system. The antenna system is applicable to a mobile terminal such as a mobile phone. With reference to FIGS. 1, 2 and 3, the antenna system comprises an antenna unit 11 and a metal cavity 12 corresponding to the antenna unit 11. The metal cavity 12 is grounded and provided with an opening 121 connected with the outside. By introducing the metal cavity, the coupling problem caused by a common ground current in the antenna unit is solved based on the cavity filter principle, and the isolation is increased.

During specific implementation, the antenna system further comprises a substrate 13. The antenna unit 11 is arranged on a front surface 131 of the substrate 13, and the metal cavity 12 is arranged on a back surface 132 of the substrate 13. The substrate 13 is made of insulating material such as epoxy resin.

The antenna unit 11 is arranged in a predetermined layout area 133 of the substrate 13. The predetermined layout area 133 and the metal cavity 12 are correspondingly arranged in the same corner area of the substrate 13, i.e., the corner area formed by a first side edge 134 and a second side edge 135 of the substrate 13.

As an alternative example, the metal cavity 12 comprises a first metal wall 122, a second metal wall, and a third metal wall 123. The first metal wall 122, the second metal wall and the third metal wall 123 are connected in pairs to form a cover-like structure, and the cover-like structure and the substrate 13 surround a cavity space.

In an alternative example, the predetermined layout area 133 is a rectangle, and the predetermined layout area 133 comprises a first edge 1331 and a second edge 1332. The first edge 1331 and the second edge 1332 are adjacent and perpendicular to each other. The first metal wall 122 is vertically connected with the substrate 13, the second metal wall is vertically connected with the substrate 13, and the first metal wall 122 is vertically connected with the second metal wall. A connection portion between the first metal wall 122 and the substrate 13 corresponds to the first edge 1331, and a connection portion between the second metal wall and the substrate 13 corresponds to the second edge 1332. The opening faces the outside of the substrate 13. As an alternative example, the third metal wall 123 is planar, and the third metal wall 123 is vertically connected with the first metal wall 122 and the second metal wall, respectively, i.e., the third metal wall 123 is parallel to the substrate 13. The third metal wall 123 is a rectangle, with a dimension matching with that of the predetermined layout area 133. The area covered by the metal cavity 12 is larger than or equal to the area corresponding to the antenna unit 11, thereby forming a better cavity filter function.

As an alternative example, a distance H between the third metal wall 123 and the substrate 13 is 4 mm. In other alternative examples, the distance between the third metal wall and the substrate is preferably in a range of 3 to 6 mm, more preferably 4 to 5 mm.

In the present Example, a length W of the first metal wall 122 is 16 mm. In other alternative examples, the length of the first metal wall may be reasonably set according to actual needs.

In the present Example, a length L3 of the substrate 13 is 136 mm, and a width L4 of the substrate 13 is 68.8 mm.

In another alternative example, the predetermined layout area is close to one side edge of the substrate. In other alternative examples, the position of the predetermined layout area may be reasonably set according to actual needs, and the metal cavity is arranged on the other surface of the substrate at a position corresponding to the position of the predetermined layout area.

In the present Example, the antenna unit 11 is an IFA antenna unit. The frequency band corresponding to the antenna unit 11 covers the sub-6G N1/N41 frequency bands. The antenna unit 11 adopts a microstrip line and is attached to the surface of the substrate.

Figure 4:
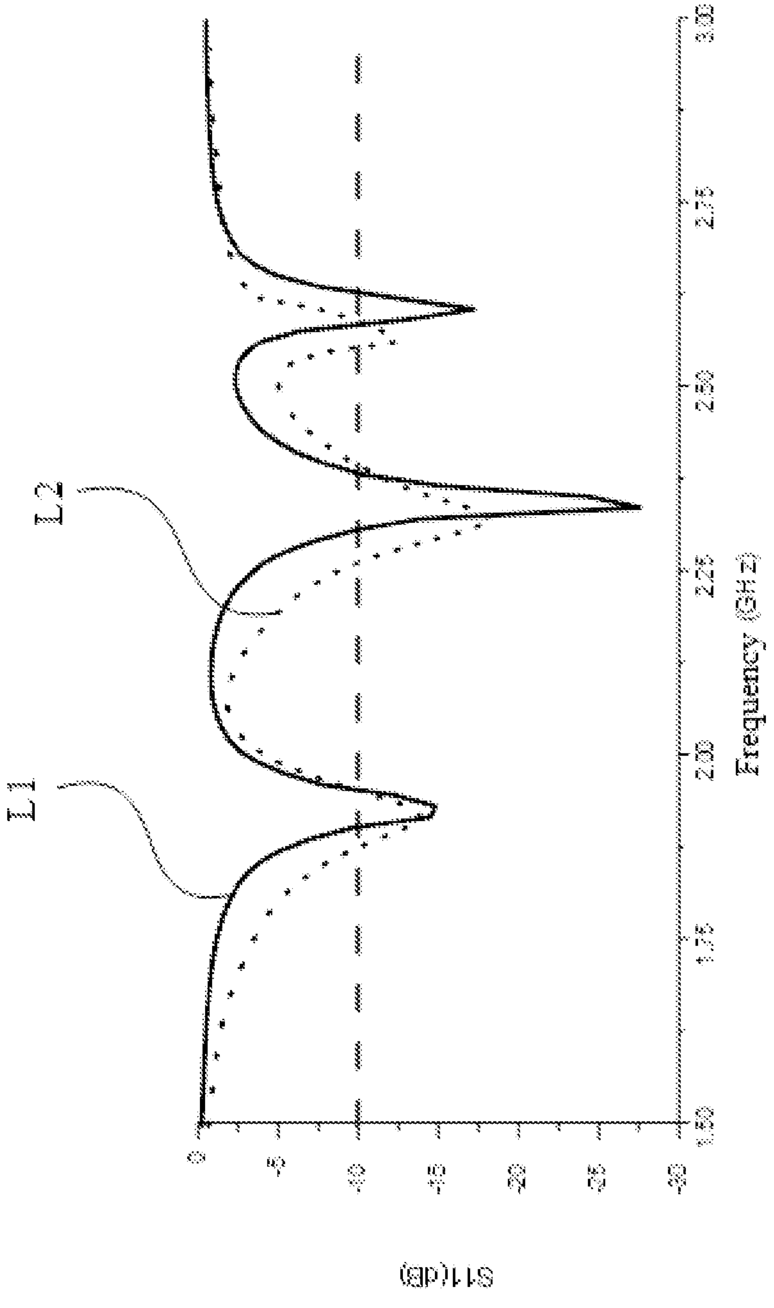
FIG. 4 shows a characteristic curve of S11 as a function of frequency for an antenna system according to Example 1 of the present application.

FIG. 4 shows a characteristic curve of S11 (input reflection coefficient) of the antenna system as a function of frequency, wherein the first curve L1 is a simulation result, and the second curve L2 is an actual measurement result.

In an example, the substrate 13 is provided with a ground plane, which is a metal layer. The ground plane covers an area of the back surface of the substrate 13 which is not surrounded by the metal cavity, and the ground plane is grounded. The first metal wall 122 and the second metal wall are connected with the ground plane and thus grounded.

Example 2

Figure 5:
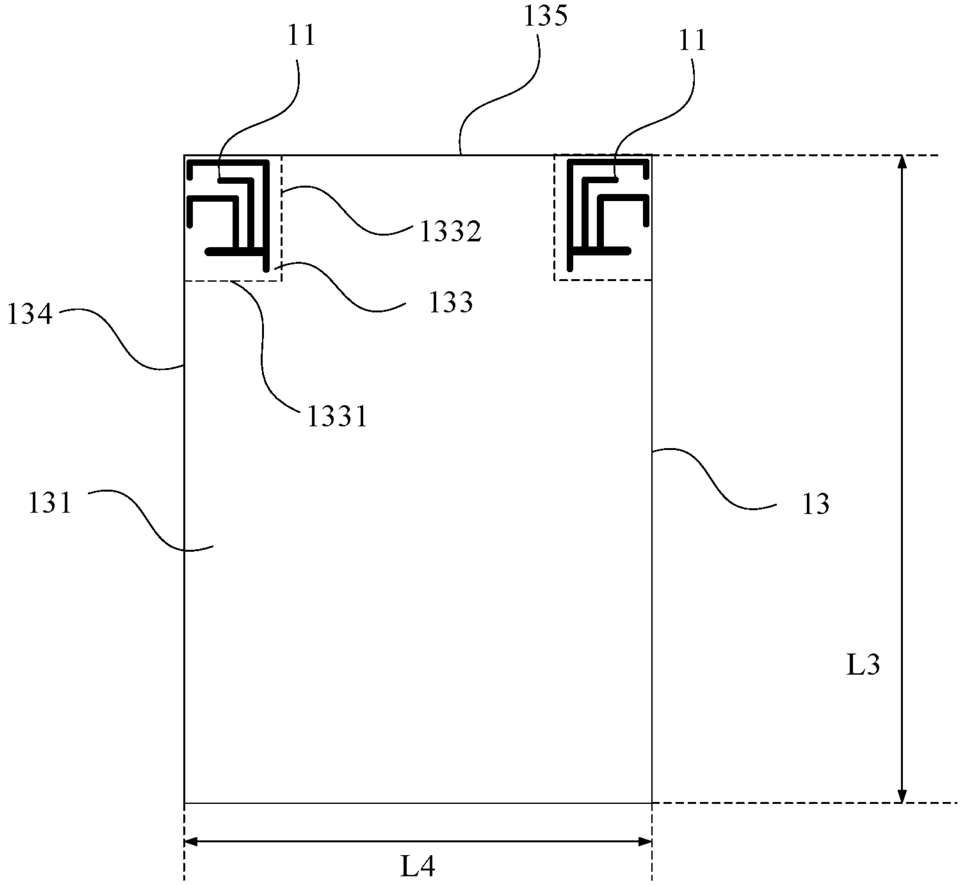
FIG. 5 shows a structural schematic view of the front surface of an antenna system according to Example 2 of the present application.
Figure 6:
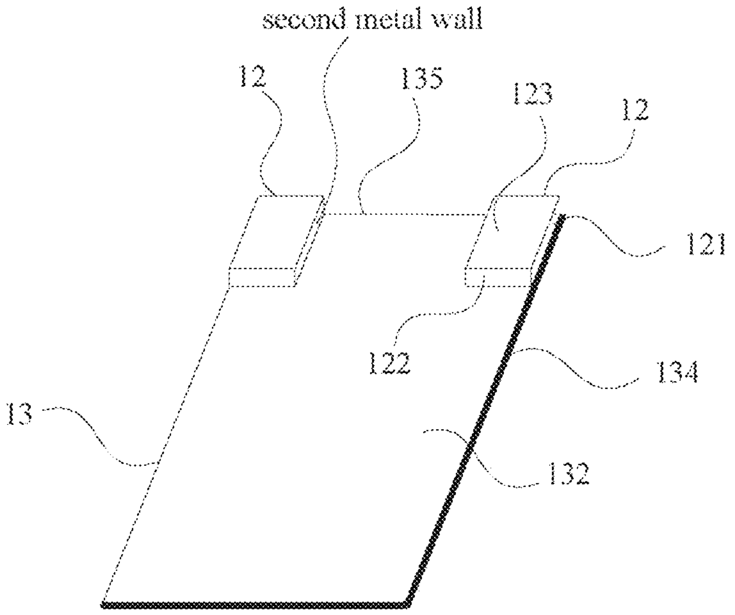
FIG. 6 shows a schematic perspective view of an antenna system according to Example 2 of the present application.

Based on the antenna system in Example 1, the present Example provides an antenna system. With reference to FIGS. 5 and 6, the antenna system is a two-unit AMMO (Multi Input Multi Output) antenna system, which comprises two antenna units 11 and is provided with two metal cavities 12 accordingly.

As an alternative example, the two antenna units 11 are symmetrically arranged, and the two metal cavities 12 are symmetrically arranged.

According to the analysis on current distribution of the antenna system in the metal cavity 12 at different frequencies, in the 1.9 GHz and 2.6 GHz frequency bands, the current on the metal ground behind the excited antenna is basically concentrated on the metal cavity 12. Therefore, by introducing the metal cavity, the coupling problem caused by a common ground current in the antenna unit 11 is solved, and the isolation is increased.

Figure 7:
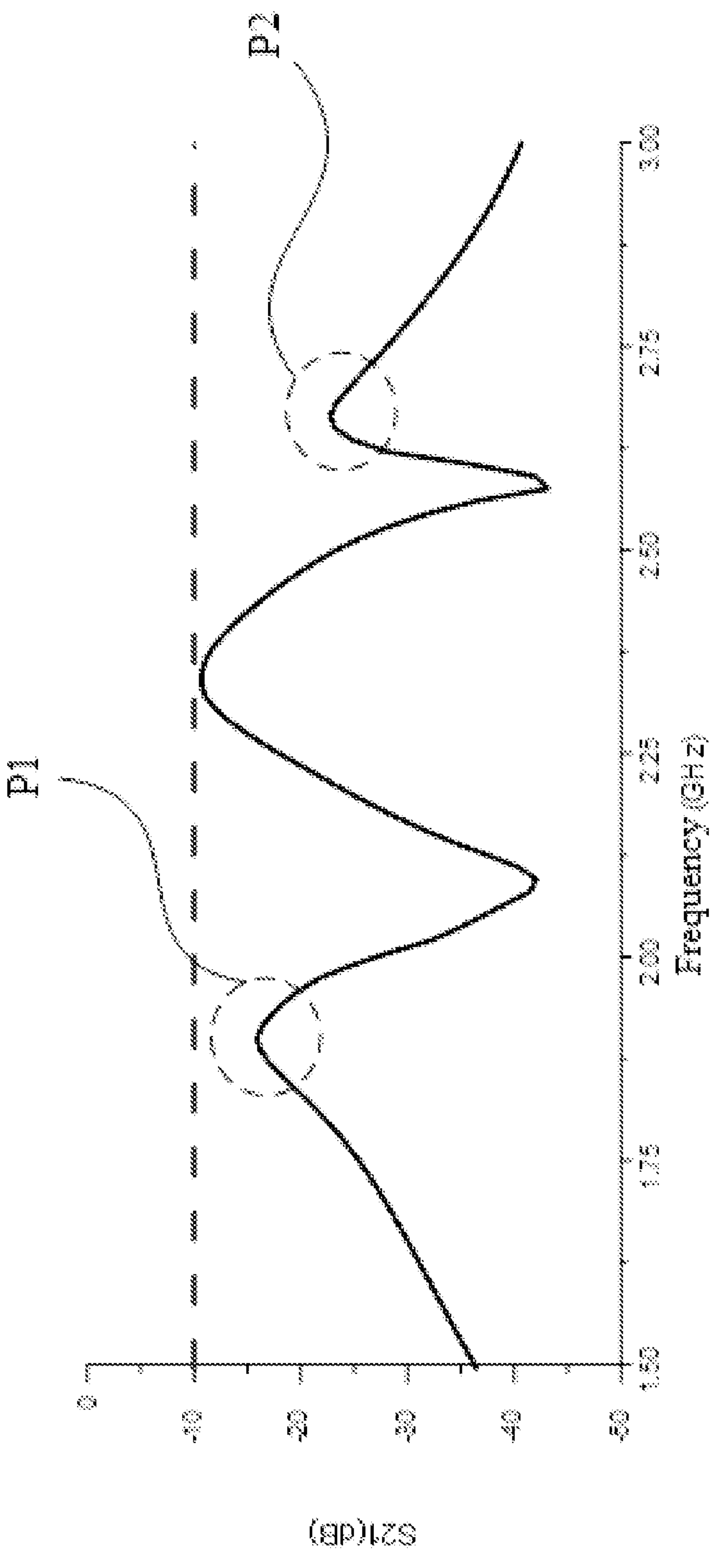
FIG. 7 shows a characteristic curve of S21 as a function of frequency for an antenna system according to Example 2 of the present application.

FIG. 7 shows a characteristic curve of S21 (reverse transmission coefficient) of the antenna system as a function of frequency, wherein the first area P1 corresponds to the N1 frequency band, and the second area P2 corresponds to the N41 frequency band. Since the metal cavity structure uses the cavity filter principle to solve the coupling caused by the common ground current, the isolation of the N1/N41 frequency bands between adjacent antennas is above 15 dB (decibel), which is a better isolation.

Figure 8:
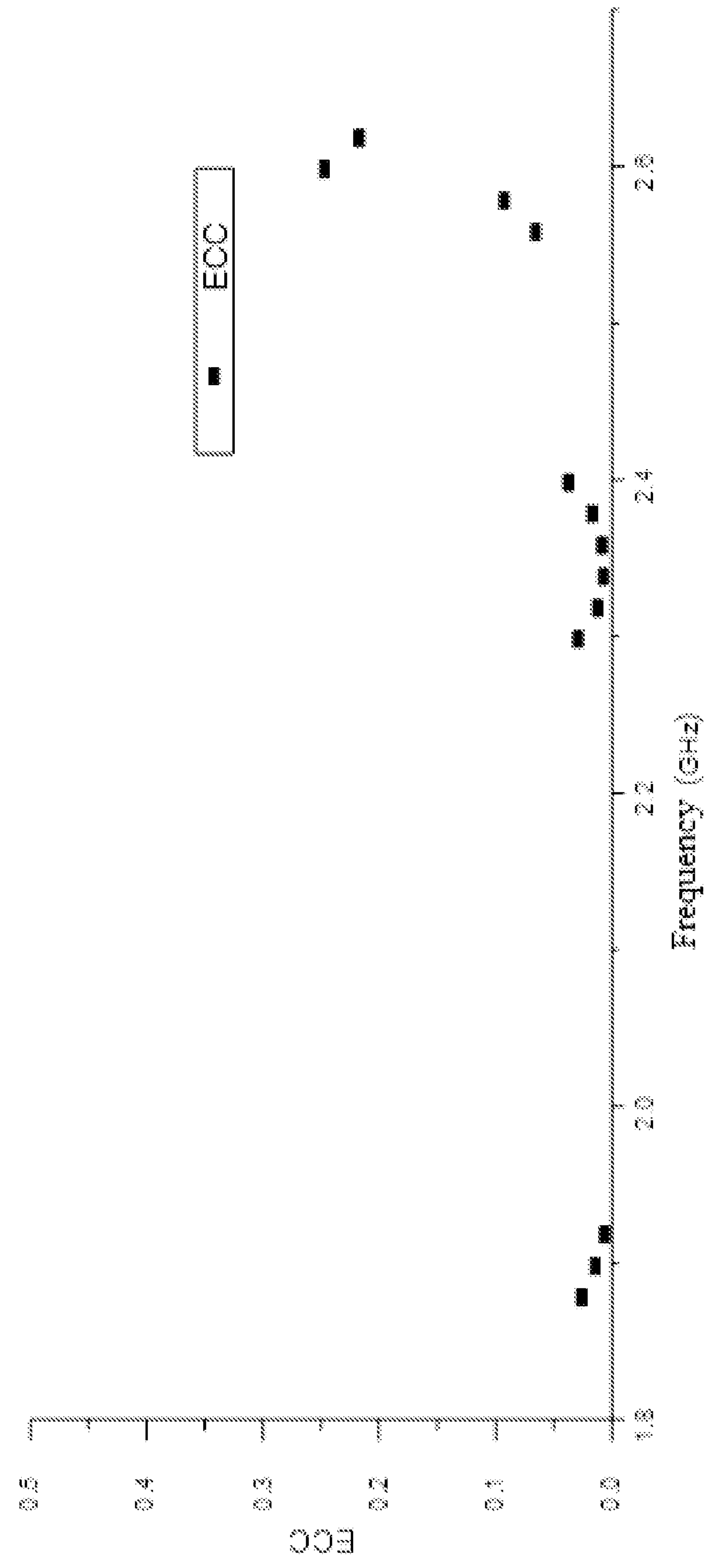
FIG. 8 is a coordinate graph showing ECC characteristics of an antenna system according to Example 2 of the present application.

FIG. 8 shows ECC (envelope correlation coefficient) characteristics between antennas of the antenna system. It can be seen that the ECC is less than 0.3, which meets the engineering design requirements.

In another alternative example, the two antenna units are asymmetrical, and the two metal cavities are arranged corresponding to the two antenna units, respectively.

Although specific embodiments of the present application have been described above, those skilled in the art should understand that this is merely for illustration, and the protection scope of the present application is defined by the appended claims. Those skilled in the art may make various changes or modifications to these embodiments without departing from the principles and essence of the present application, and all of these changes and modifications fall within the protection scope of the present application.

What is claimed is:

1. An antenna system, comprising:
- a single planar substrate having a front surface and a back surface;
- an antenna unit attached to the front surface of the single planar substrate; and
- a metal cavity adjacent to the antenna unit, the metal cavity attached to the back surface of the single planar substrate, the metal cavity comprising a first metal wall, a second metal wall and a third metal wall,
- wherein the first metal wall and the second metal wall are vertically connected with the single planner substrate, and the third metal wall is parallel to the front surface,
- wherein the first metal wall, the second metal wall and the third metal wall are connected in pairs to form a cover-like structure, and the cover-like structure and the single planner substrate surround a cavity space, a distance between the third metal wall and the single planner substrate is 3 to 6 mm,
- wherein the metal cavity is grounded and provided with an opening connected with the outside, and
- the third metal wall and the antenna unit overlap across the single planar substrate, and
- the area of the single planar substrate covered by the third metal wall is larger than or equal to the area covered by the antenna unit.

2. The antenna system according to claim 1, wherein the antenna unit is arranged in a predetermined layout area of the single planar substrate, and the predetermined layout area is close to a side edge of the single planar substrate.

3. The antenna system according to claim 2, wherein the predetermined layout area is close to two adjacent side edges of the single planar substrate.

4. The antenna system according to claim 3, wherein the two adjacent side edges of the single planar substrate are perpendicular to each other.

5. The antenna system according to claim 1, wherein the predetermined layout area is a rectangle and comprises a first edge and a second edge, the first edge and the second edge being adjacent and perpendicular to each other;
- the first metal wall is vertically connected with the second metal wall;
- a connection portion between the first metal wall and the single planar substrate corresponds to the first edge, a connection portion between the second metal wall and the single planar substrate corresponds to the second edge; and
- the opening faces the outside of the single planar substrate.

6. The antenna system according to claim 5, wherein the third metal wall is a rectangle, and the third metal wall is vertically connected with the first metal wall and the second metal wall, respectively.

7. The antenna system according to claim 6, wherein the single planar substrate is provided with a ground plane, which covers an area of the back surface of the single planar substrate which is not surrounded by the metal cavity.

8. The antenna system according to claim 1, wherein the number of the antenna units is 2, and the number of the metal cavities is 2.

9. The antenna system according to claim 8, wherein the two antenna units are symmetrically arranged, and the two metal cavities are symmetrically arranged.

10. The antenna system according to claim 1, wherein the antenna unit is an IFA antenna unit.

11. The antenna system according to claim 10, wherein the frequency band corresponding to the antenna unit covers the sub-6G N1/N41 frequency bands.

* * * * *